(12) United States Patent
Hatch

(10) Patent No.: US 11,913,556 B2
(45) Date of Patent: Feb. 27, 2024

(54) ANTI-SPIN OUTER DIAMETER GUIDED COMPRESSOR VALVE

(71) Applicant: SIEMENS ENERGY, INC., Orlando, FL (US)

(72) Inventor: Glenn D. Hatch, Corning, NY (US)

(73) Assignee: Siemens Energy, Inc., Orlando, FL (US)

( * ) Notice: Subject to any disclaimer, the term of this patent is extended or adjusted under 35 U.S.C. 154(b) by 9 days.

(21) Appl. No.: 17/855,904

(22) Filed: Jul. 1, 2022

(65) Prior Publication Data

US 2024/0003446 A1    Jan. 4, 2024

(51) Int. Cl.
| | |
|---|---|
| *F16K 15/06* | (2006.01) |
| *F04B 35/04* | (2006.01) |
| *F04B 53/10* | (2006.01) |
| *F16K 27/02* | (2006.01) |

(52) U.S. Cl.
CPC ........... *F16K 15/066* (2013.01); *F04B 35/04* (2013.01); *F04B 53/10* (2013.01); *F16K 27/0209* (2013.01); *Y10T 137/7838* (2015.04)

(58) Field of Classification Search
CPC ............ Y10T 137/7838; F16K 15/066; F16K 27/0209; F04B 53/129; F04B 35/04; F04B 53/10
See application file for complete search history.

(56) References Cited

U.S. PATENT DOCUMENTS

| | | | | |
|---|---|---|---|---|
| 2,071,390 A | * | 2/1937 | Crowell ................. | E21B 21/10 |
| | | | | 137/540 |
| 2,094,951 A | * | 10/1937 | Frank ................. | F04B 39/1013 |
| | | | | 137/538 |
| 2,579,667 A | * | 12/1951 | Hanson ................. | F16K 15/066 |
| | | | | 137/512.2 |

(Continued)

FOREIGN PATENT DOCUMENTS

| | | |
|---|---|---|
| WO | 2014159502 A1 | 10/2014 |
| WO | 2017064154 A1 | 4/2017 |

OTHER PUBLICATIONS

PCT International Search Report and Written Opinion of the International Searching Authority dated Sep. 11, 2023 corresponding to PCT Application No. PCT/US2023/067645 filed May 31, 2023.

*Primary Examiner* — Craig M Schneider
*Assistant Examiner* — Frederick D Soski

(57) ABSTRACT

A valve assembly for a reciprocating gas compressor includes a seat, a guard plate attached to the seat, elements, and springs is presented. The seat defines inlet openings, each inlet opening extends through the seat along a central longitudinal axis of each inlet opening. The guard plate defines element bores, each element bore aligning with one of the inlet openings along the central longitudinal axis. Each element includes a first end with a first recessed surface and a second end with a second recessed surface, the first end and the second end cooperating to define a cylindrical shape therebetween, and an extension protruding outward from the outer diameter of the element. Each element is (Continued)

positioned within one of the element bores and movable between an open position in which the element contacts the guard plate and a closed position in which the element contacts the seat.

11 Claims, 10 Drawing Sheets

(56) References Cited

U.S. PATENT DOCUMENTS

| | | | | |
|---|---|---|---|---|
| 2,624,587 | A * | 1/1953 | Watson | F16K 15/066 137/538 |
| 2,719,002 | A * | 9/1955 | Glomb | F04B 39/066 137/512.1 |
| 2,941,629 | A * | 6/1960 | Rohacs | F16K 47/0111 188/320 |
| 3,175,577 | A * | 3/1965 | King | F04B 39/1033 137/516.21 |
| 3,177,893 | A * | 4/1965 | King | F16K 17/0413 137/512.1 |
| 3,286,727 | A * | 11/1966 | Theodor | F04B 39/1053 137/516.13 |
| 3,309,013 | A * | 3/1967 | Bauer | F04B 39/10 137/516.13 |
| 3,309,014 | A * | 3/1967 | Bauer | F16K 15/066 417/571 |
| 3,357,449 | A * | 12/1967 | King | F04B 39/10 137/512.1 |
| 3,358,710 | A * | 12/1967 | Page | F04B 39/1053 137/533.27 |
| 3,536,094 | A * | 10/1970 | Manley, Jr. | F04B 39/1033 137/512.1 |
| 3,602,247 | A * | 8/1971 | Bunn | F16K 15/066 137/512.1 |
| 3,656,500 | A * | 4/1972 | Mayer, Sr. | F16K 15/08 137/271 |
| 3,945,397 | A * | 3/1976 | Riedel | F04B 39/1053 137/514 |
| 4,184,508 | A * | 1/1980 | Mayer | F04B 39/1053 137/512.1 |
| 4,278,106 | A * | 7/1981 | Cunningham | F04B 39/1033 137/516.13 |
| 4,307,751 | A * | 12/1981 | Mayer | F16K 17/044 137/516.13 |
| 4,333,495 | A * | 6/1982 | Griswold | F16K 15/063 137/484.2 |
| 4,398,559 | A * | 8/1983 | Bunn | F16K 17/0413 137/540 |
| 4,687,435 | A * | 8/1987 | Matsuzaka | F23C 15/00 431/1 |
| 4,869,289 | A * | 9/1989 | Hrabal | F16K 15/063 137/512.1 |
| 4,872,481 | A | 10/1989 | Shaw et al. | |
| 4,889,156 | A * | 12/1989 | Woolatt | F16K 15/12 137/516.21 |
| 4,951,706 | A * | 8/1990 | Kardos | F16K 15/10 137/516.13 |
| 5,036,880 | A * | 8/1991 | Safford | F04B 39/1053 137/516.21 |
| 5,311,902 | A * | 5/1994 | Overfield | F16K 15/066 137/516.13 |
| 5,511,583 | A * | 4/1996 | Bassett | F16K 15/025 137/512.1 |
| 6,510,868 | B2 * | 1/2003 | Penza | F16K 15/1402 137/516.21 |
| 10,436,203 | B2 | 10/2019 | Schulz | |
| 10,859,078 | B2 * | 12/2020 | Schulz | F04B 39/1013 |
| 11,396,869 | B2 * | 7/2022 | Schulz | F04B 39/1053 |
| 11,486,505 | B2 * | 11/2022 | Schulz | F16K 15/023 |
| 2004/0016459 | A1 * | 1/2004 | Thompson | F16K 27/003 137/512.1 |
| 2006/0180208 | A1 * | 8/2006 | Walpole | F16K 31/084 137/528 |

\* cited by examiner ns 404 are arranged in a series of rows and columns with
ANTI-SPIN OUTER DIAMETER GUIDED COMPRESSOR VALVE

BACKGROUND

Gas compressors and in particular reciprocating gas compressors often include a compressor valve that controls the flow of gas to be compressed into the compressor. Due to flow and operating constraints, these compressor valves often include a number of smaller poppet style elements that are each opened and closed simultaneously.

Typical poppet style elements of a reciprocating compressor valve have the degree of freedom to rotate about their centerline, however, the rotating elements can contact the seat component of the valve when the valve closes causing excessive wear to the elements and the other components of the compressor valve leading to reduced valve life.

BRIEF SUMMARY

A valve assembly for a reciprocating gas compressor includes a seat, a guard plate attached to the seat, a plurality of elements, and a plurality of springs. The seat defines a plurality of inlet openings, each inlet opening of the plurality of inlet openings extends through the seat along a central longitudinal axis of each inlet opening so that all the central longitudinal axes are parallel to one another. The guard plate defines a plurality of element bores, each element bore of the plurality of element bores aligning with one of the inlet openings along the central longitudinal axis of the inlet opening. Each element of the plurality of elements includes a first end with a first recessed surface and a second end with a second recessed surface, the first end and the second end cooperating to define a cylindrical shape therebetween and an extension protruding outward from the outer diameter of the element. Each element is positioned within one of the plurality of element bores and movable between an open position in which the element contacts the guard plate and a closed position in which the element contacts the seat. Each spring of the plurality of springs is positioned within one of the element bores and within the second recessed surface to bias the element toward the closed position.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
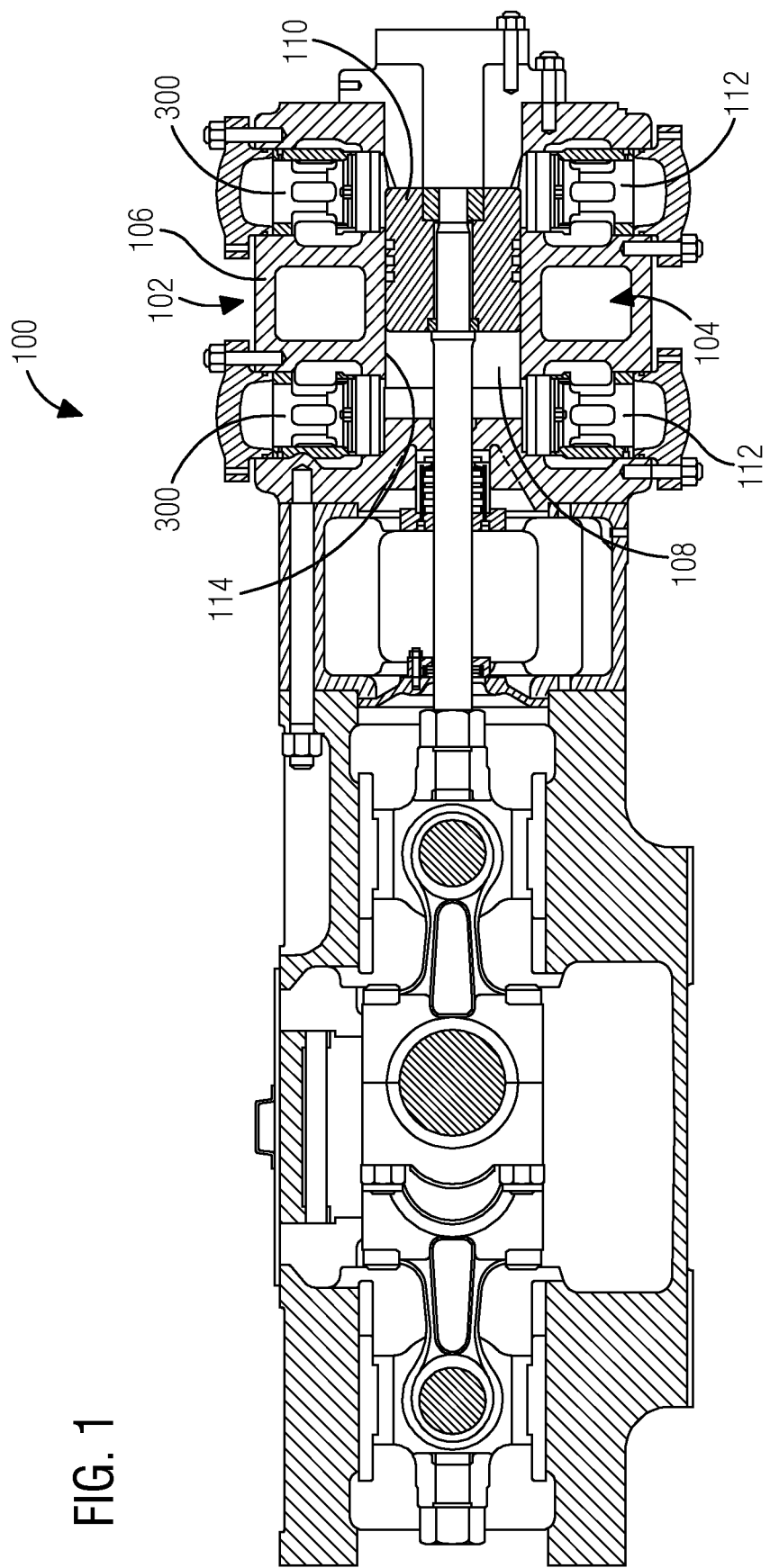
FIG. 1 illustrates a section view of a portion of a reciprocating gas compressor.

FIG. 1 illustrates a portion of a reciprocating gas compressor 100 that is driven by a prime mover, such as an electric motor or other engine to produce a compressed gas. The reciprocating gas compressor 100 includes one or more casings 106 that each define a cylinder 114 that supports a piston 110 for reciprocating movement. The piston 110 and the casing 106 cooperate to define a compression space 108 that has a volume that varies with the reciprocating motion of the piston 110 to draw in a gas to be compressed and to compress the gas as is well known.

A gas inlet 102 is provided in the casing 106 to receive a supply of gas to be compressed and a gas outlet 104 is formed in the casing 106 to collect the compressed gas produced by the reciprocating gas compressor 100. As will be discussed in greater detail, a number of compressor valve assemblies 300 are coupled to the casing 106 and are positioned between the gas inlet 102 and the compression space 108 to control the admission of uncompressed gas into the compression space 108. Similarly, a number of discharge valves 112 are provided between the compression space 108 and the gas outlet 104 to control the outflow of compressed gas.

Figure 2:
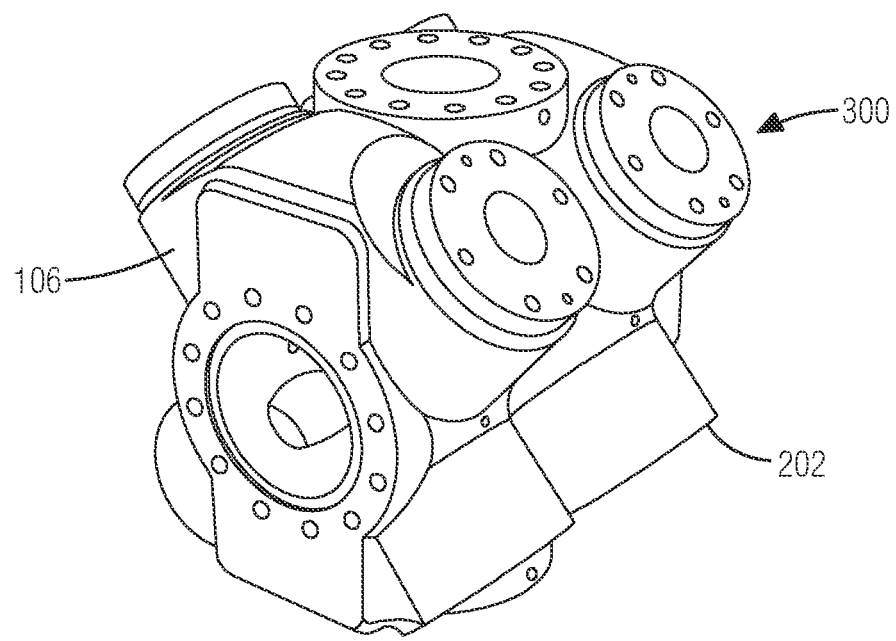
FIG. 2 illustrates a perspective view of a portion of the reciprocating gas compressor of FIG. 1 including a compressor valve assembly location.

FIG. 2 illustrates a portion of the reciprocating gas compressor 100 that includes the casing 106 and defines a number of inlet/outlet bores 202. One compressor valve assembly 300 is attached to each of four of the inlet/outlet bores 202 with four discharge valves 112 (not shown) attached to the remaining four inlet/outlet bores 202. Of course, other arrangements could have more or fewer compressor valve assemblies 300 and discharge valves 112 as may be required for the particular design.

Figure 3:
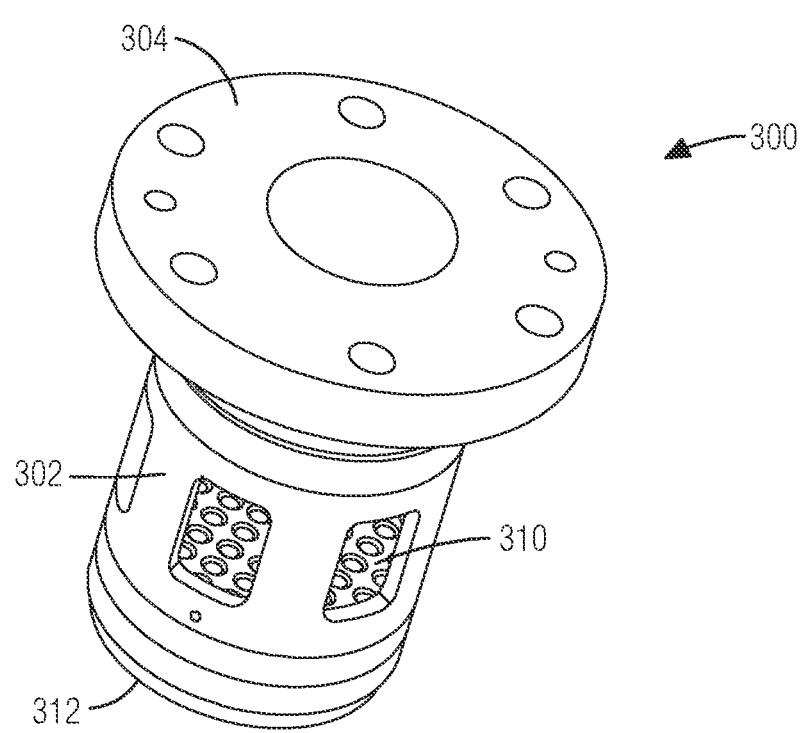
FIG. 3 illustrates a perspective view of the compressor valve assembly of FIG. 2.

FIG. 3 illustrates one of the compressor valve assemblies 300 of FIG. 2 with all the compressor valve assemblies 300 being substantially the same. The compressor valve assembly 300 includes a valve housing 302 that supports the remaining components in their desired operating positions and a flange 304 that is arranged to facilitate the attachment of the compressor valve assembly 300 to the casing 106. In the illustrated construction, the flange 304 includes a plurality of apertures arranged to receive fasteners that attach the compressor valve assembly 300 to the casing 106. The compressor valve assembly 300 also includes a seat 310 and a guard plate 312 positioned at the one end of the valve housing 302.

Figure 4:
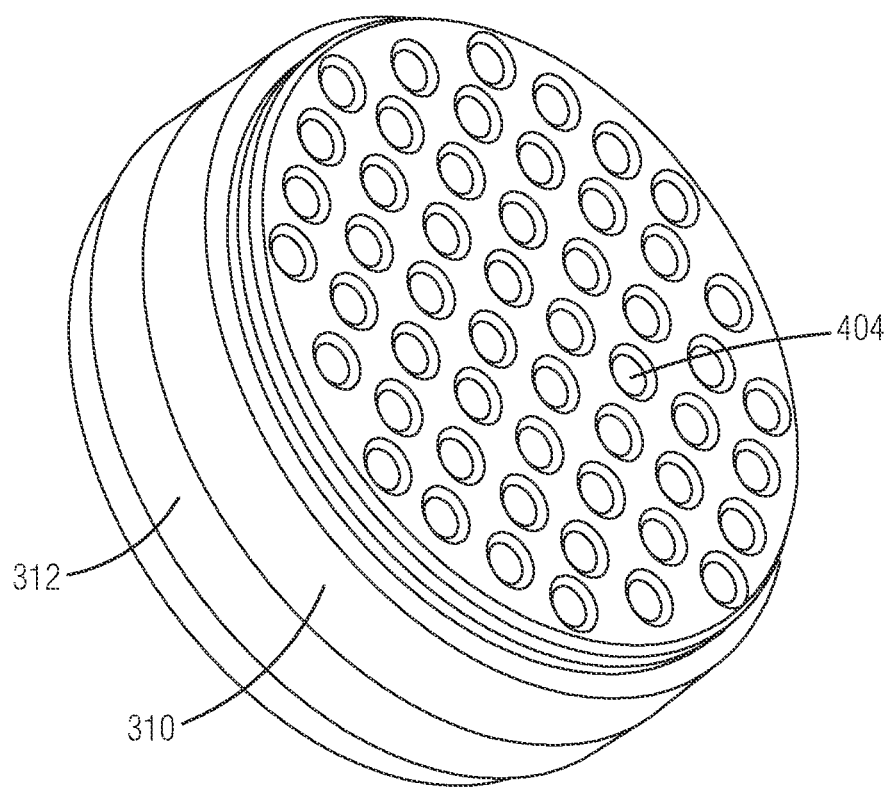
FIG. 4 illustrates a perspective view of a compressor valve of FIG. 3.

FIG. 4 illustrates an assembled compressor valve showing the guard plate 312, the seat 310 with the remainder of the compressor valve assembly 300 omitted. The seat 310 includes a plurality of inlet openings 404 with each inlet opening 404 passing through the seat 310. The inlet openings 404 are arranged in a series of rows and columns with other arrangements being possible. In the illustrated construction, fifty-two inlet openings 404 are employed with typical applications including twelve or more. Of course, any suitable number of inlet openings 404 could be employed as required.

Figure 5:
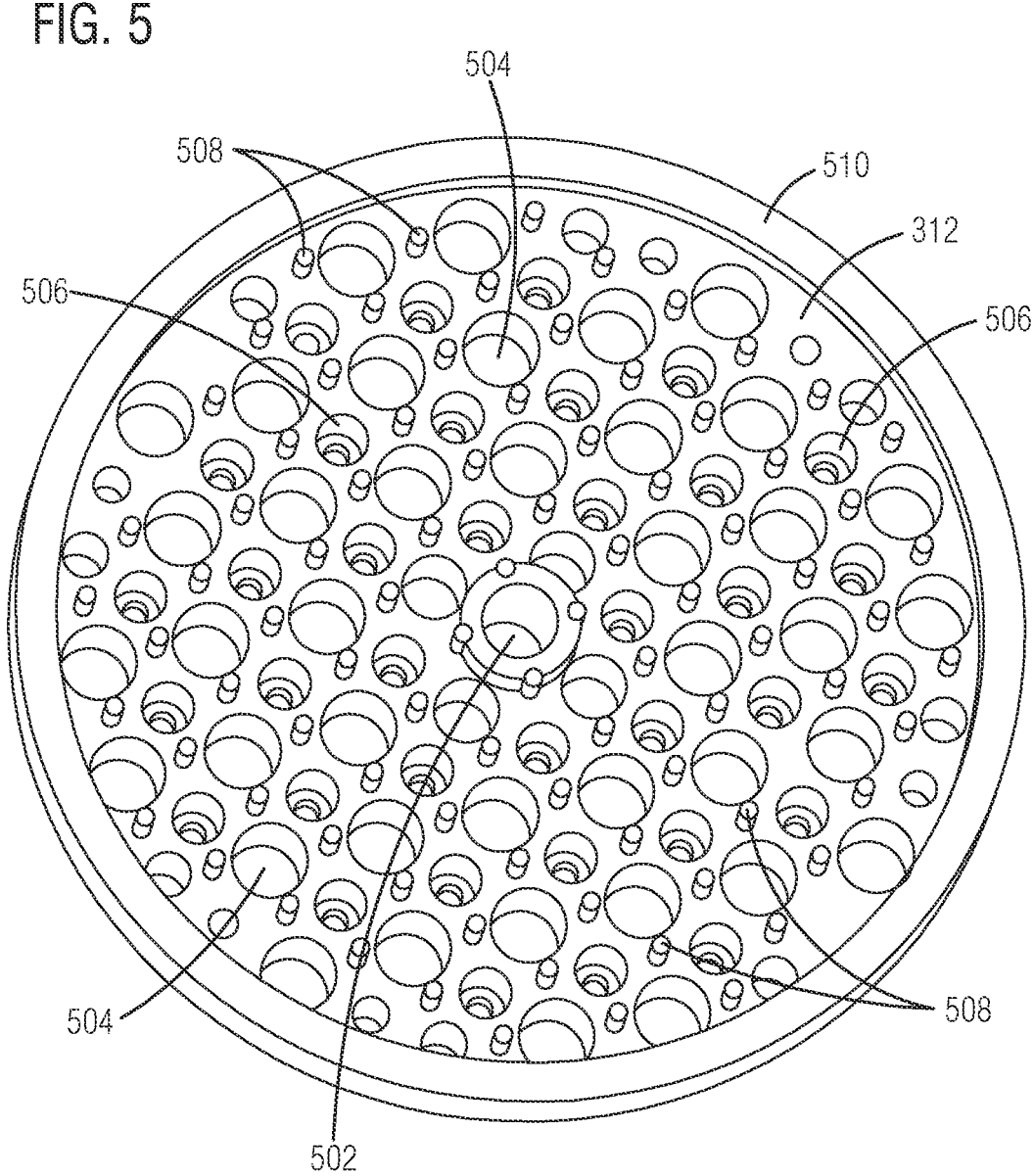
FIG. 5 illustrates a top view of a guard plate with guide pins installed.

FIG. 5 illustrates an embodiment of a guard plate 312. In the illustrated embodiment, the guard plate 312 includes a central bore 502, a plurality of element bores 506 and a plurality of outlet openings 504. Dowel pins are used to ensure the alignment of the seat 310 to the guard plate 312. The guard plate 312 includes a lip 510 on its outer circumference so that the interior surface of the guard plate 312 is recessed from the surface of the lip 510. Thus, when the seat 310 and the guard plate 312 are attached, a flow space 906 (see FIGS. 9A and 9B) exists between the seat 310 and the guard plate 312.

The outlet openings 504 and the element bores 506 are arranged adjacent one another in a series of rows and columns. With this arrangement, each element bore 506 is most closely surrounded by four outlet openings 504. Similarly, each element bore 506 is aligned with and coaxial with an inlet opening 404 of the seat 310 while the outlet openings 504 are arranged parallel to the inlet openings 404 but are offset or misaligned. The element bores 506 each include a seat at one end of the element bore 506 to receive and contain the element 702 and spring 610.

The guard plate 312 also includes, in an embodiment, a guide pin 508 that extends through an a opening within the guard plate 312 and into the flow space 906. FIG. 5 illustrates a plurality guide pins 508 positioned, for the most part, in between adjacent element bores 506 and in between adjacent outlet openings 504. Typically, a quantity of four guide pins 508 are located around each element bore 506 to provide guidance and to prevent the element 702 from spinning.

Figure 6:
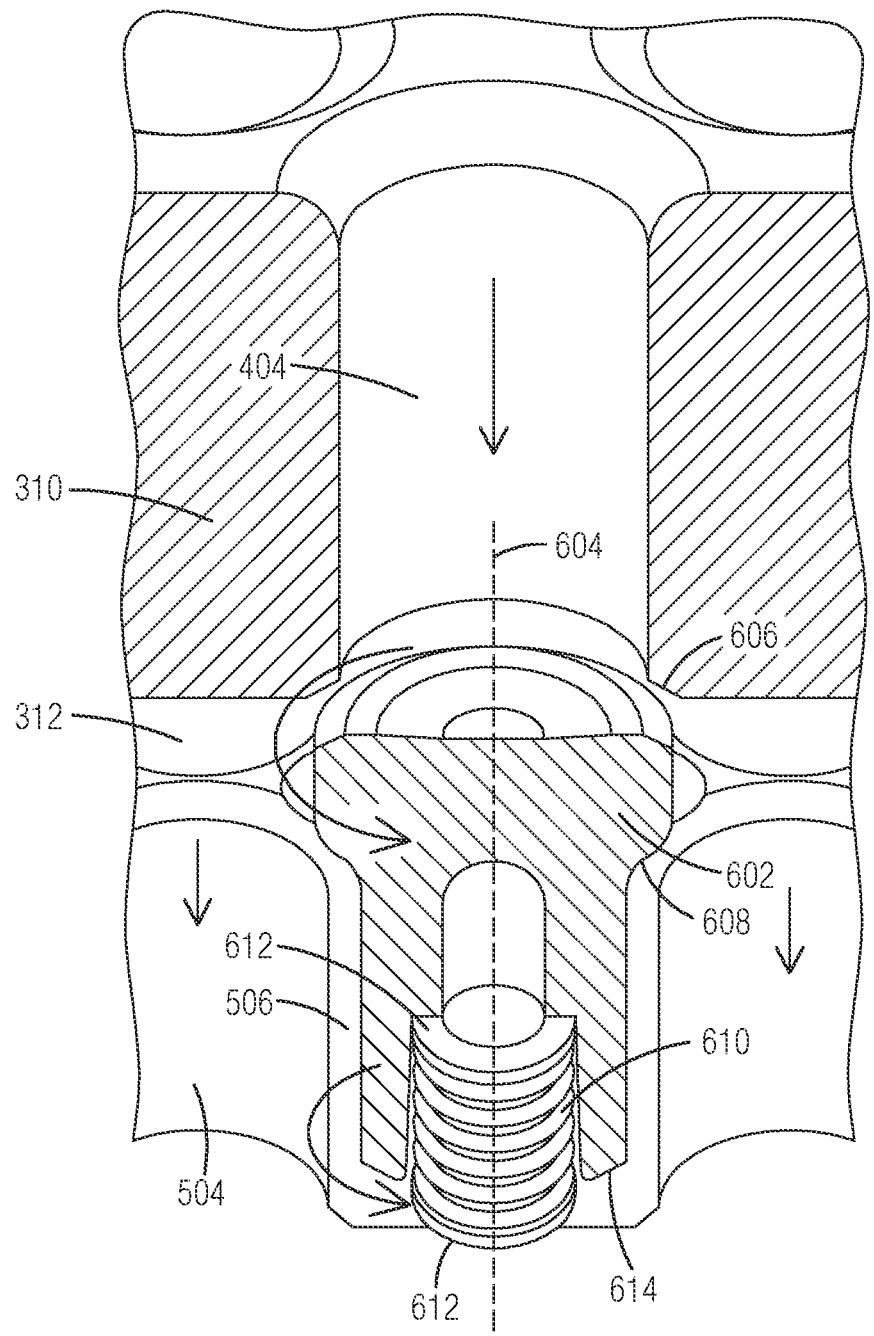
FIG. 6 illustrates a cross sectional view of a prior art element.

FIG. 6 is a cross sectional view of a conventional element 602, i.e., a cylindrical poppet style element as was mentioned previously. The cylindrical element 602 is positioned within an element bore 506 in the guard plate 312 and is operable between a first open position and a second closed position. When the element 602 is in the open position (as shown in FIG. 6), the cylindrical element 602 contacts the element guard 614, and a fluid flow can pass through the inlet opening 404 and out through the outlet opening 504.

The cylindrical element 602 has a degree of freedom to rotate about its centerline which, in the shown embodiment, is about the central longitudinal axis 604. Fluid flow (direction shown by arrow) around the elements 602 is dynamic and unbalanced which can cause unbalanced forces around the outer head of the element 602 leading to element rotation. Seat wear occurs when the rotating cylindrical element 602 contacts the seat 310 at the seat edge 606 as the compressor valve closes. Similarly, the cylindrical element 602 may also experience element wear at the sealing surface when contacting the seat 310. In addition, guard wear may occur when the rotating cylindrical element 602 rotates as the compressor valve opens and spring wear 612 may occur during the opening and closing of the cylindrical element 602 as the spring 610 is in contact with the rotating element 602.

Figure 7A:
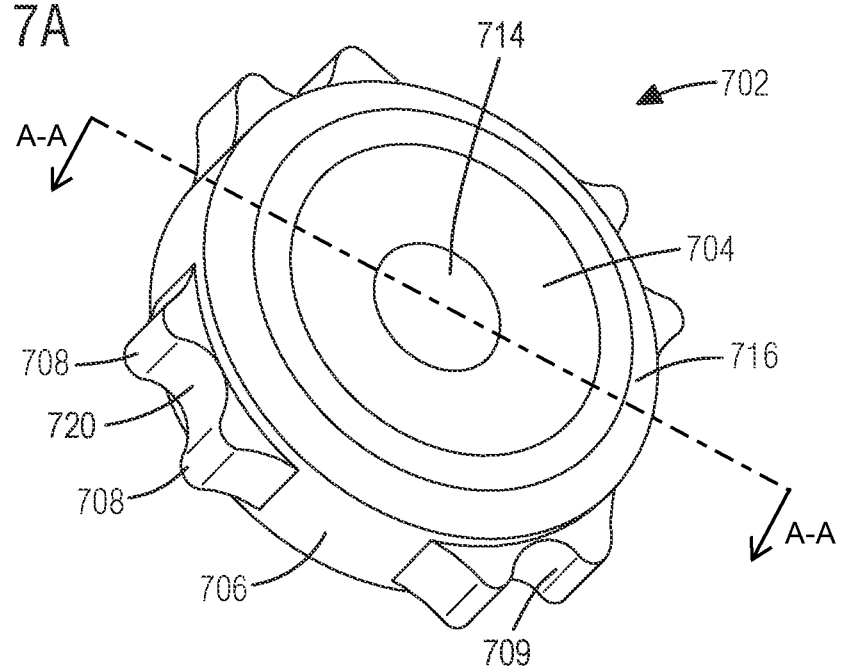
FIG. 7A illustrates a perspective view of surface of an embodiment of a cylindrical element.
Figure 7B:
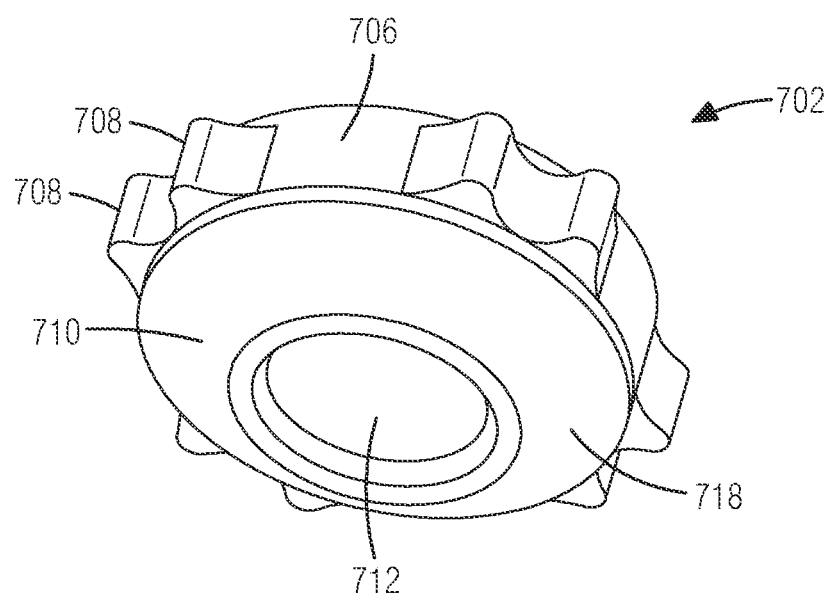
FIG. 7B illustrates a perspective view of a further surface of the embodiment of FIG. 7A.

FIG. 7A and FIG. 7B illustrates perspective views of a proposed a element 702 having a cylindrical shape. FIG. 7A illustrates a first end surface 704 of the element 702. The first end surface 704 includes a sealing surface 716, disposed around the perimeter of the first end surface 704, which contacts the seat 310 when the reciprocating gas compressor 100 closes and produces a seal between the inlet opening 404 and the flow space 906. The first end surface 704 also includes a first recessed surface 714 in a central portion of the first end surface 704. The first recessed surface 714 may be a concave surface. The recessed portion improves the efficiency of the fluid flow by lowering the pressure dome height above the first end surface 704 which is created from the flow of gas impeding against the first end surface 704 while the compressor valve is open. A lower pressure dome height above the first end surface 704 reduces the pressure losses by allowing gas to flow more freely around the element 702.

The element 702 also includes a cylindrical surface 706 on the outer diameter of the cylindrical-shaped element 702. The cylindrical surface 706 includes a curved extensions 708 that protrude from the cylindrical surface 706. In an embodiment, each extension 708 includes a curved surface 709 that interacts with a guide pin 508 mounted in the guard plate 312. The extensions 708 are positioned around the cylindrical surface in a pair defining an inwardly curved surface 720 in between the pair that interacts with a guide pin 508 that extends between the pair of extensions 708. The element 702 may include up to 4 pairs of extensions 708 evenly spaced around the cylindrical surface 706.

FIG. 7B illustrates a second end surface 710 of the element 702. The second end surface 710 includes an impact surface 718 which contacts the guard plate 312 when the reciprocating gas compressor 100 opens providing a positive stop for the element 702. The impact surface 718 is disposed around the perimeter of the second end surface 710. The second end surface 710 also includes a second recessed surface 712 in the central portion of the second end surface 710 and centered around the center of the second end surface 710. The second recessed surface 712 may include a concave surface.

Figure 8A:
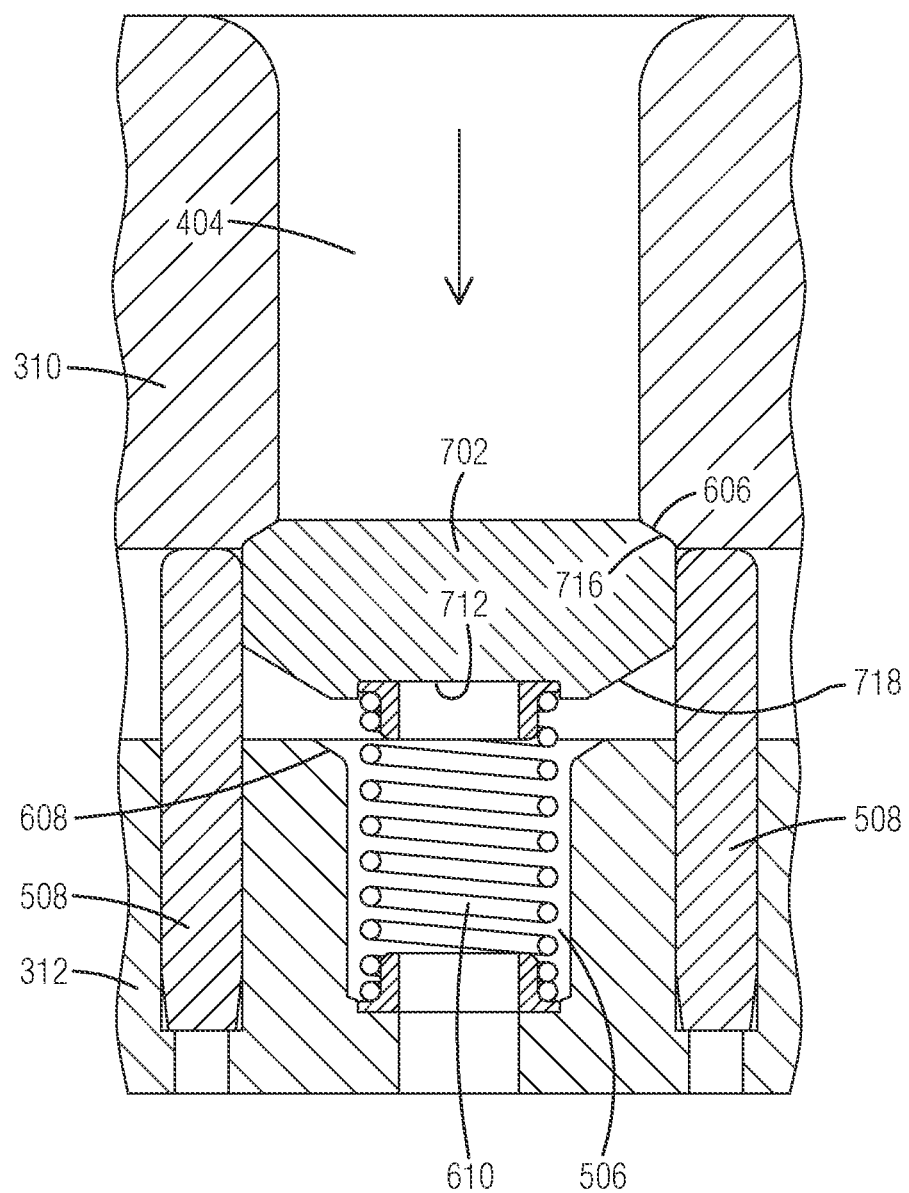
FIG. 8A illustrates a cross sectional view of an embodiment of a cylindrical element positioned in an element bore in a closed position through cut plane A-A of FIG. 7A.

FIG. 8A is a cross sectional view of the proposed element 702 in a closed position. Similar to the conventional element 602 described above, the element 702 is positioned within element bore 506 in the guard plate 312 and is operable between a first open position and a second closed position. When the element 702 is in the closed position, the sealing surface 716 of element 702 seals against the seat 310 at the seat edge 606 and a fluid flow does not pass through the inlet opening 404. Guide pins 508 extend through the guard plate 312 on either side of the element 702. A spring 610 fits into the second recessed surface 712 on the second end surface 710 which centers the spring 610. The spring 610 biases the element 702 towards the closed position.

Figure 8B:
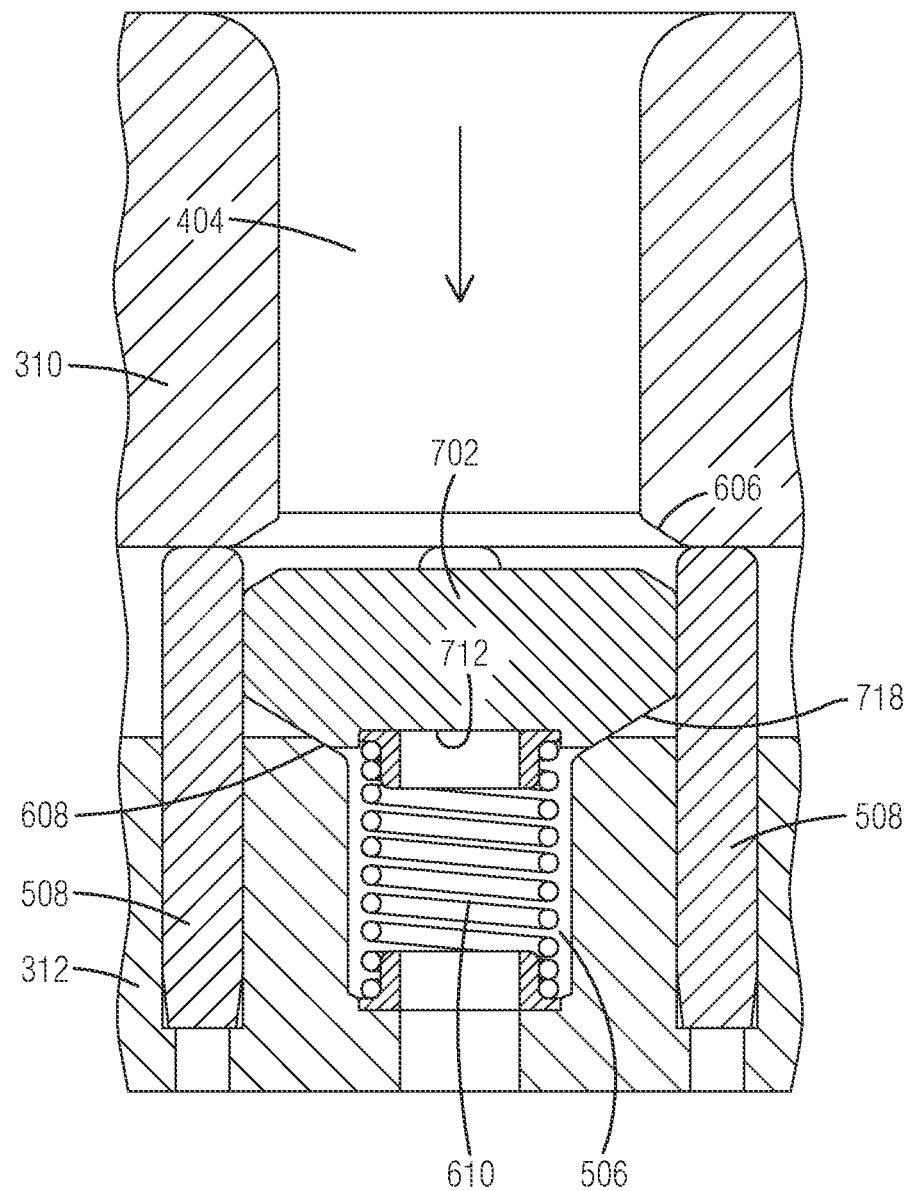
FIG. 8B illustrates a cross sectional view of an embodiment of a cylindrical element positioned in an element bore in an open position through cut plane A-A of FIG. 7A.

FIG. 8B is a cross sectional view of the proposed element 702 in an open position. When the element 702 is in the open position, the element 702 is retracted from the seat edge 606 compressing the spring 610 and contacts the guard surface 608 so a fluid flow can pass from the inlet openings 404 and through the outlet openings 504 to enter the compression space 108.

Figure 9A:
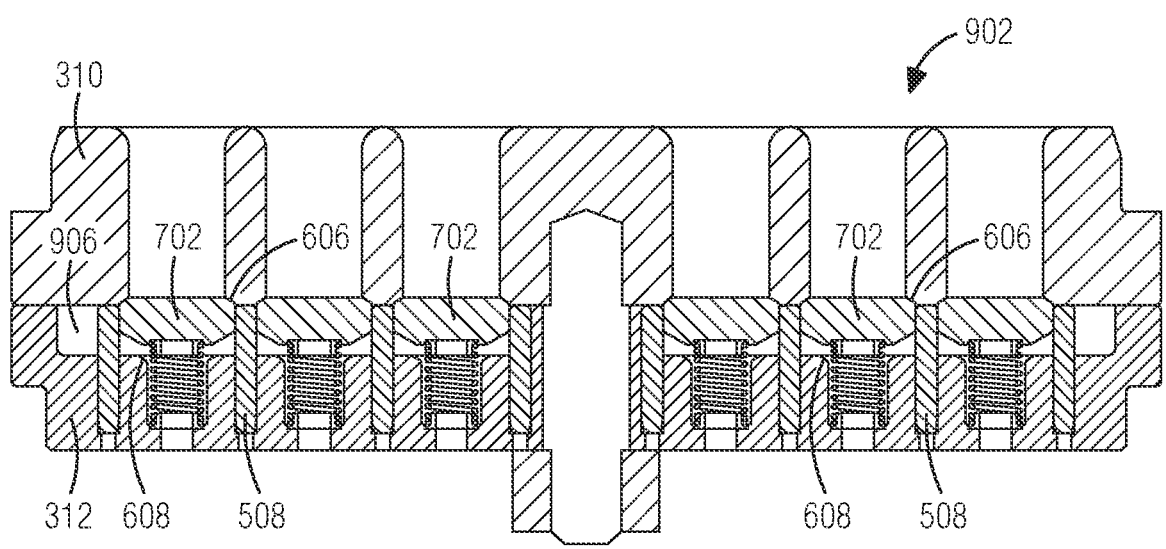
FIG. 9A illustrates a sectional view through the center of the compressor valve with the cylindrical elements in the closed position.
Figure 9B:
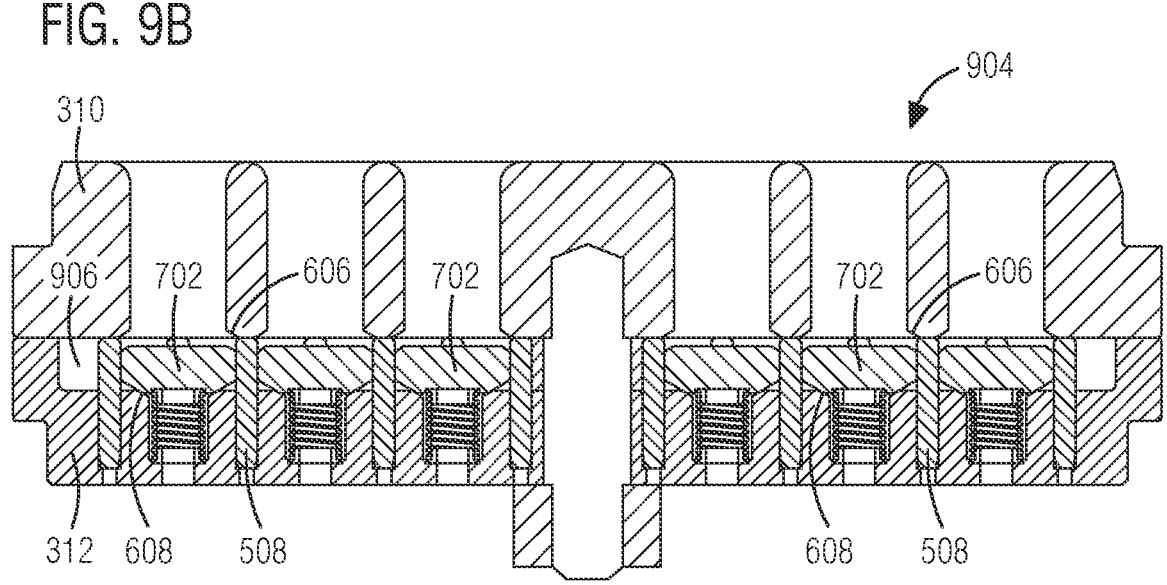
FIG. 9B illustrates a sectional view through the center of the compressor valve with the cylindrical elements in the open position.

FIG. 9A and FIG. 9B show sectional views of the compressor valve assembly 300. FIG. 9A indicates the compressor valve with closed elements 902 in which the elements 702 make contact with the seat edge 606. FIG. 9B indicates the compressor valve with open elements 904 in which the elements 702 make contact with the guard surface 608.

Figure 10:
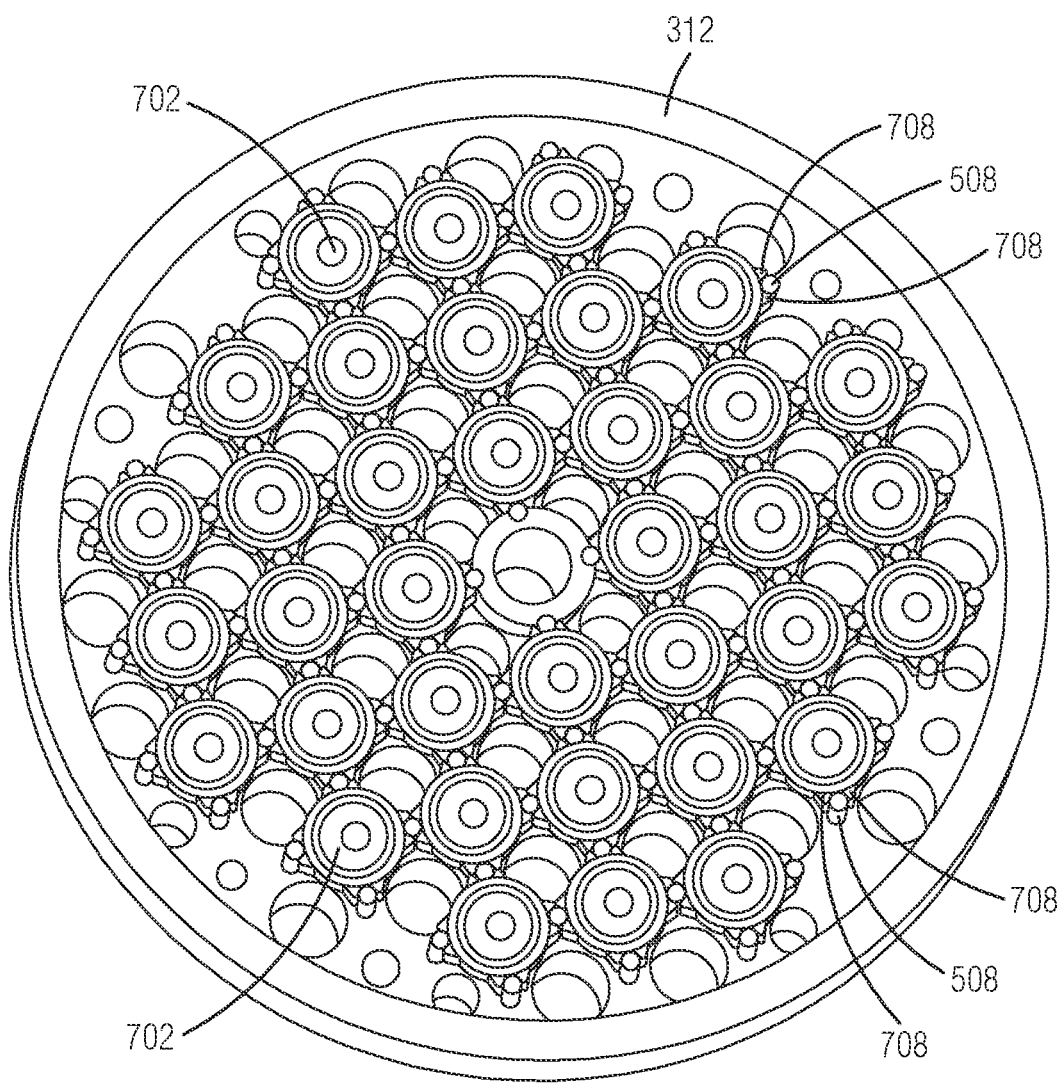
FIG. 10 illustrates a top view of the guard plate with the cylindrical elements installed.

FIG. 10 illustrates a perspective view of the guard plate 312 with the elements 702 installed. In the installed state, the guide pins 508 can prevent the rotation of the elements 702. FIG. 10 shows each element 702 having four pairs of extensions 708 protruding from its cylindrical surface with four guide pins 508 surrounding each element 702. Each guide pin 508 extends between a corresponding pair of extensions 708 to prevent the rotation of the element 702, however, only one pair of extensions 708 with a corresponding guide pin 508 extending between the pair of extensions 708 would work to prevent rotation of the element 702.

In operation, the cylindrical element in conjunction with the guide pin(s) positioned in the guard plate guide the cylindrical element between the seat and guard as well as prevent the cylindrical element from spinning or rotating about its centerline. In comparison to the rotating cylindrical element shown in FIG. 6, the proposed cylindrical element, guided on its outer diameter by the extensions and corresponding guide pins on the head of the element, do not need a stem portion positioned in the depth of the element bore in the guard plate for guidance. In addition, as the cylindrical element does not rotate about its centerline, the wear of the components described above is mostly prevented extending the life of the components.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope. The scope of patented subject matter is defined only by the allowed claims. Moreover, none of these claims are intended to invoke a means plus function claim construction unless the exact words "means for" are followed by a participle.

What is claimed is:

1. A valve assembly comprising:
   a compressor or pump;
   a seat defining a plurality of inlet openings, each inlet opening of the plurality of inlet openings extending through the seat along a central longitudinal axis of each inlet opening so that all the central longitudinal axes are parallel to one another;
   a guard plate attached to the seat and defining a plurality of element bores, each element bore of the plurality of element bores aligning with one of the inlet openings along the central longitudinal axis of the inlet opening;
   a plurality of elements, each element comprising:
      a first end with a first recessed surface and a second end with a second recessed surface, the first end and the second end defining a cylindrical shape therebetween, and
      wherein each element is positioned within one of the plurality of element bores and movable between an open position in which the element contacts the guard plate and a closed position in which the element contacts the seat;
   a plurality of springs, each spring positioned within one of the element bores and within the second recessed surface biasing the element toward the closed position;
   a guide pin fixedly coupled to the guard plate and extending toward the seat along an axis that is parallel to the central longitudinal axis; and
   wherein each element further comprises a pair of extensions protruding from the outer diameter of the element, wherein the guide pin is adjacent to the pair of extensions and extends between the pair of extensions, and wherein a surface of the element between the pair of extensions is concave with respect to a center line of the element.

2. The valve assembly of claim 1, wherein the guard plate further defines a plurality of outlet openings positioned within and extending through the guard plate.

3. The valve assembly of claim 2, wherein each of the inlet openings is arranged adjacent to one of the outlet openings, and wherein in the open position, each inlet opening is in fluid communication with the one of the outlet openings.

4. The valve assembly of claim 3, wherein the plurality of element bores are arranged in a series of rows and columns in the guard plate.

5. The valve assembly of claim 4, wherein each element bore of the plurality of element bores includes at least two adjacent outlet openings.

6. The valve assembly of claim 1, wherein the guide pin engages with the pair of extensions and the surface to inhibit rotation of the element.

7. The valve assembly of claim 1, further comprising a plurality of pairs of extensions, and wherein the plurality of pairs of extensions is in a range of 2-4 pairs.

8. The valve assembly of claim 1, wherein the first recessed surface includes a concave portion centered around a center line of the element.

9. The valve assembly of claim 1, wherein the first recessed surface includes a first sealing surface disposed around the perimeter of the first recessed surface and arranged to form a seal with the seat.

10. The valve assembly of claim 1, wherein the second recessed surface includes a concave portion centered around a center line of the element to center a respective spring of the plurality of springs.

11. The valve assembly of claim 1, wherein the second recessed surface includes a second sealing surface disposed around the perimeter of the second recessed surface and arranged to form a positive stop with the guard plate.

* * * * *